(12) United States Patent
Duh et al.

(10) Patent No.: US 6,297,315 B1
(45) Date of Patent: Oct. 2, 2001

(54) PROCESS FOR PREPARING POLYTRIMETHYLENE TEREPHTHALATE

(75) Inventors: Ben Duh, Tallmadge, OH (US);
Ye-Mon Chen, Sugar Land, TX (US);
Ann Marie Corey, Akron, OH (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/309,923

(22) Filed: May 11, 1999

(51) Int. Cl.[7] .................................................. C08L 67/02
(52) U.S. Cl. ........................................ 524/605; 528/499
(58) Field of Search ............................... 524/605; 528/499

(56) References Cited

U.S. PATENT DOCUMENTS

| | | |
|---|---|---|
| 2,829,771 | 8/1958 | Dahlstrom . |
| 3,014,011 * | 12/1961 | Zoetbrood . |
| 5,532,335 | 7/1996 | Kimball et al. .................... 528/495 |
| 5,540,868 | 7/1996 | Stouffer et al. ...................... 264/13 |
| 5,763,104 | 6/1998 | Stouffer et al. .................... 528/503 |
| 5,782,935 * | 7/1998 | Hirt et al. ............................ 8/512 |

FOREIGN PATENT DOCUMENTS

| | | | |
|---|---|---|---|
| 1294019 | 2/1957 | (DE) . | |
| 0631007 * | 12/1994 | (EP) . | |
| WO 97/23543 | 7/1997 | (WO) | .......................... C08G/63/88 |

* cited by examiner

*Primary Examiner*—Ana Woodward (57) ABSTRACT

The pelletized product of melt condensation polymerization of 1,3-propanediol and terephthalic acid (or alkyl ester thereof) is crystallized by immersion in water at a temperature within the range of 60 to about 100° C. Hot-water treatment increases the crystallinity of the polymer to at least about 35% and increases pellet density to about 1.33 g/cm$^3$.

10 Claims, 6 Drawing Sheets

Figure 3
DSC Thermogram of Clear PTT Pellet

Figure 4
DSC Thermogram of Partially Crystallized PTT

Figure 5
DSC Thermogram of Well Crystallized PTT

Figure 7

PROCESS FOR PREPARING POLYTRIMETHYLENE TEREPHTHALATE

BACKGROUND OF THE INVENTION

This invention relates to the preparation of 1,3-propanediol based polyesters such as polytrimethylene terephthalate. In one aspect, the invention relates to a process for reducing the tendency of polytrimethylene terephthalate pellets to stick together during storage or transportation, particularly at elevated temperatures such as encountered in warm climates. In a further aspect, the invention relates to the reduction of fines in the manufacture of polytrimethylene terephthalate.

Polytrimethylene terephthalate is a polyester useful in fiber applications in the carpet and textile industries. The manufacture of polytrimethylene terephthalate involves the condensation polymerization of 1,3-propanediol and terephthalic acid to a polymer having an intrinsic viscosity (IV) of about 0.5 to 1.0 dl/g. The polymer melt is discharged from the bottom of the melt reactor and extruded through an extrusion die into strands. The strands are quenched in cold water and cut into pellets for storage or transportation.

It has been found that polytrimethylene terephthalate pellets tend to stick together, or "block," during storage or shipping at temperatures above the polymer Tg (about 45°C.), which can be reached during the summer in a silo or rail car. Agglomeration of the pellets can also occur during drying using a hopper-type dryer.

It is therefore an object of the invention to produce polytrimethylene terephthalate pellets which are resistant to blocking during storage or shipping. It is a further object to produce polytrimethylene terephthalate pellets which can be dried in a hopper without agglomeration. It is a further object of one aspect of the invention to reduce fines production in the manufacture of polytrimethylene terephthalate.

BRIEF SUMMARY OF THE INVENTION

According to the invention, the polyester product of condensation polymerization of 1,3-propanediol and terephthalic acid is stabilized against blocking by immersing pellets of the polyester in an aqueous liquid such as water at a temperature within the range of 60 to about 100 ° C. for a time sufficient to achieve a crystallinity of at least about 35% and a pellet density of at least about 1.33 g/cm$^3$.

The process is preferably carried out in a continuous liquid moving bed. The desired pellet properties are generally reached in an immersion time within the range of about 3 seconds to about 3 minutes.

DETAILED DESCRIPTION OF THE INVENTION

The invention involves the preparation of polytrimethylene terephthalate pellets which have improved stability against blocking at elevated temperatures.

In general, polytrimethylene terephthalate is prepared by reacting, at elevated temperature, a molar excess of 1,3-propanediol with terephthalic acid in a two-stage (esterification/polycondensation) process, with removal of by-product water, for a time effective to produce a polytrimethylene terephthalate having an intrinsic viscosity (measured in 60:40 phenol:tetrachloroethane at 30° C.) of at least about 0.5 dl/g.

The esterification step is carried out at a temperature within the range of about 230 to about 300° C., preferably about 240 to about 270° C., under elevated pressure, preferably under nitrogen gas, within the range of about 20 to about 200 psi, preferably about 50 psi. Excess 1,3-propanediol and byproduct water are removed by suitable means such as overhead distillation as the esterification proceeds.

The esterification product, a low IV prepolymer, is then polycondensed under vacuum in the presence of a catalyst while byproduct water is removed. Suitable polycondensation catalysts include compounds of titanium or tin, such as titanium butoxide, present in an amount within the range of about 10 to about 400 ppm titanium or tin, based on the weight of the polymer. The polymerization conditions are selected so as to produce a molten polyester having a target intrinsic viscosity of at least about 0.5 dl/g.

The polytrimethylene terephthalate is discharged from the melt reactor and passed through an extrusion die to form polymer melt strands which are cooled and partially solidified by contact with cold water on a strand guide. The sequence of pelletization/crystallization is not critical. Pre-pelletizing crystallization involves immersion of polymer melt strands in hot water prior to cutting of the strands, preferably en route from the extruder to the pelletizer. The preferred method, however, for process efficiency and pellet quality, is to conduct crystallization downstream of pelletization.

Figure 1:
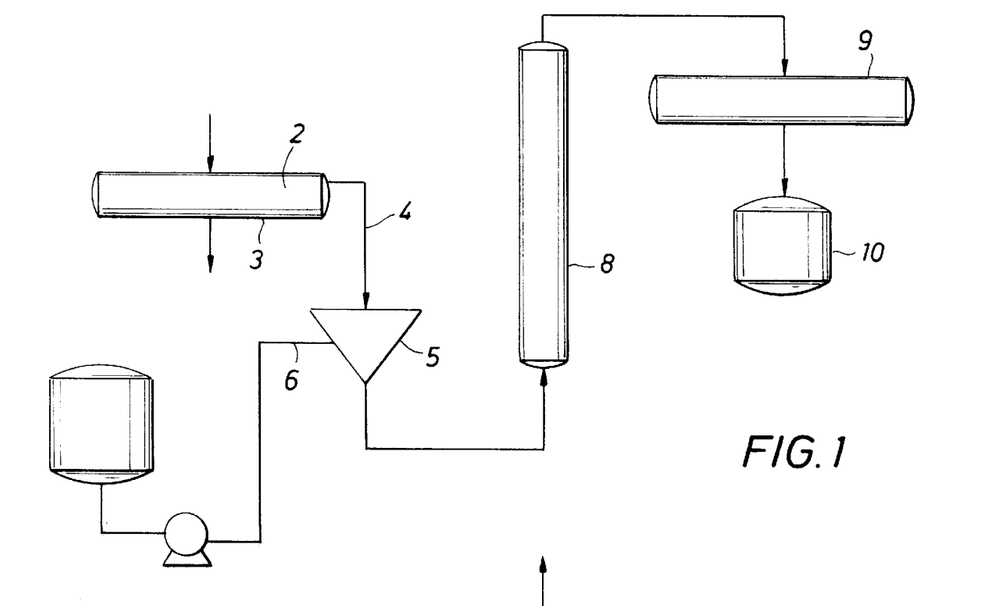
FIG. 1 is a process flow diagram of one embodiment of the invention polytrimethylene terephthalate preparation process.

Immediately after pelletization, the surfaces of the pellets are solid while the cores are still partially molten. To prevent the pellets from sticking together, the pellets are flushed with additional cooling water, which completely solidifies the pellets and transports them to a dewatering screen to remove most of the water. The pellets at this stage are clear and have a low degree of crystallinity. The pellets are then charged to the hot water crystallizer, which can be any vessel that provides agitation, the desired fluid temperature and appropriate residence time. A liquid moving bed is preferred because it offers uniform residence time and uniform heating of the pellets, to produce uniform pellet crystallization and opacity. In its simplest form, crystallization can be carried out in an elongated conduit between the pelletizer and the pellet dryer, such as, for example, a 4—6" diameter pipe through which a hot water slurry of pellets is passed at a rate which results in the desired hot water contact time. Such a configuration is shown in FIG. 1.

Crystallization of the pellets can be carried out in a batch or continuous process. For batch processes, crystallization can be carried out in any suitable holding vessel that provides hot water agitation for adequate heat transfer and temperature control. The process is preferably carried out continuously for an efficient commercial process. Integration of crystallization into a continuous polymerization process requires coordination with upstream and downstream processing and careful control of pellet residence time in the crystallizer for uniform crystallization of the pellets. For process economics, it is preferred that crystallization be carried out on the pelletization line, maximizing the use of residual pellet heat and eliminating the need for an additional pellet dryer. In either batch or continuous crystallization, the polytrimethylene terephthalate pellets will be immersed in hot water at temperatures within the range of 60 to about 100° C., preferably about 65 to about 85° C., for a time sufficient to achieve the desired crystallinity. As used herein, "crystallinity" indicates the degree of crystallization. In general, a crystallinity greater than about 35%, preferably within the range of about 36 to about 45%, measured as described below, is desired.

According to a preferred process, polytrimethylene terephthalate pellets exiting the pelletizer are washed with transport water onto a screen through which most of the water is drained. The pellets are then conveyed mechanically to a hot water a crystallizer, which can be, for example, a vertical or horizontal liquid agitated vessel, a liquid fluidized bed, a hydraulic transfer system using hot water as the transfer medium, or a liquid moving bed providing the desired fluid temperature and residence time. A liquid moving bed is preferred because it provides uniform residence time and uniform heating of the pellets, resulting in uniform pellet crystallinity and opacity.

Figure 2:
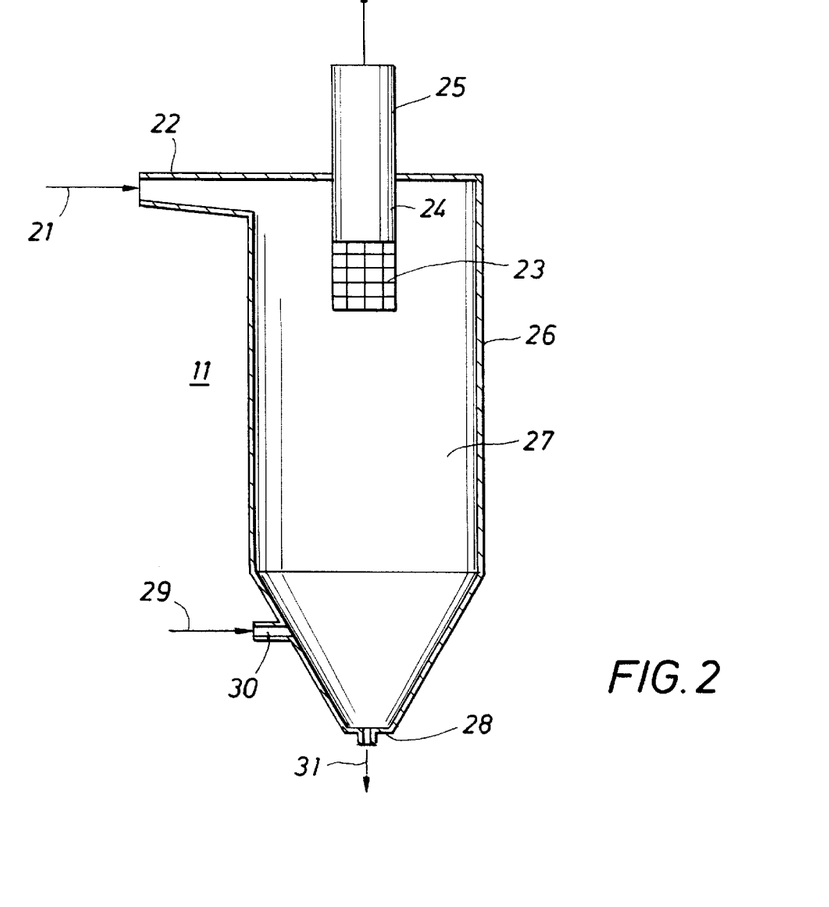
FIG. 2 is a schematic diagram of a crystallizer vessel in which polytrimethylene terephthalate pellets are contacted with hot water in a moving liquid bed.

A preferred crystallization vessel, which is the subject of copending patent application Ser. No. 09/309,921, filed May 11, 1999, is designed for continuous crystallization of polytrimethylene terephthalate pellets in a liquid moving bed. As can be seen in FIG. 2, polytrimethylene terephthalate pellets in a water slurry 21 are introduced tangentially for vortex flow into the upper portion of vessel 11 via horizontally-oriented entry conduit 22. Water passes through screen 23, into center tube 24, and out of the tube via exit conduit 25, while the pellets rotate in a descending route along cylindrical crystallizer wall 26. The descending pellets form a slow-moving bed in plug flow as they approach the middle portion 27 of the crystallizer vessel. Flow of crystallized pellets from the crystallizer is assisted by local fluidization near the bottom of the vessel, in the cone portion. This can be achieved with a total water flow rate such that the liquid velocity within the bottom cone region is well above the minimum fluidization velocity while the liquid velocity within the upper cyclindrical region of the vessel is below the minimum fluidization velocity. The speed of downward movement of the pellet bed is dependent on the speed of pellet discharge at the lower end 28 of the vessel and the flow of incoming hot water stream 29 from a water surge vessel (not shown) into the crystallizer via hot water inlet 30. The incoming water temperature will be within the range of about 65 to about 100° C., preferably about 65 to about 85°C. Pellet residence time in the crystallizer will typically range from about 1 to about 5 minutes.

Figure 3:
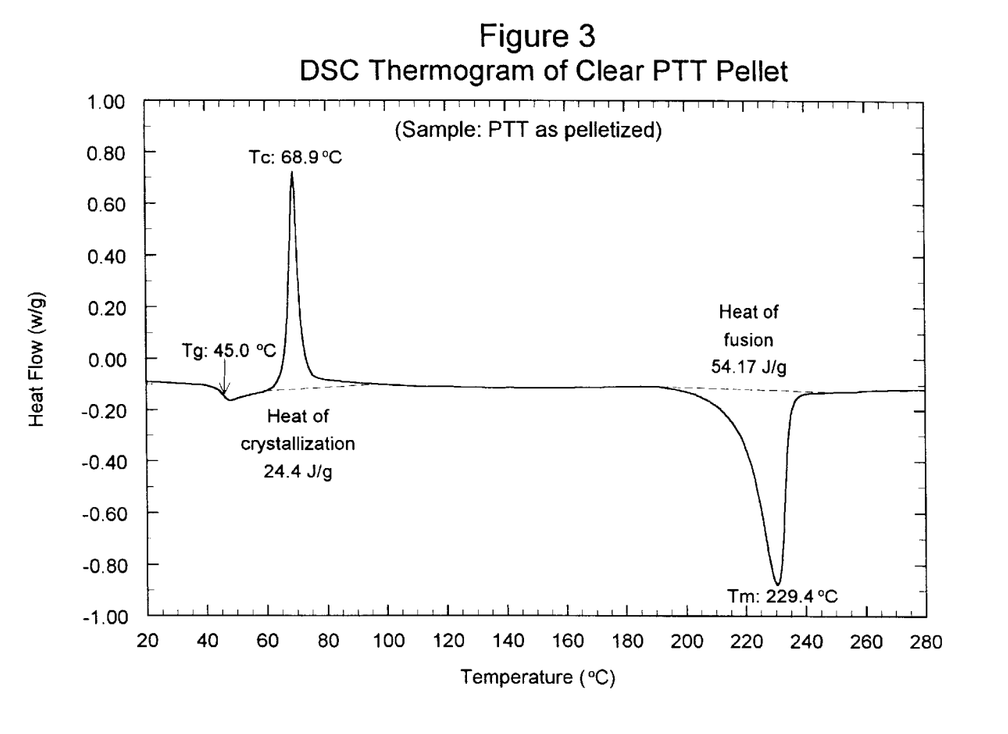
FIG. 3 is a differential scanning calorimetric (DSC) thermogram of a clear, as-pelletized polytrimethylene terephthalate sample, with no additional crystallization.
Figure 4:
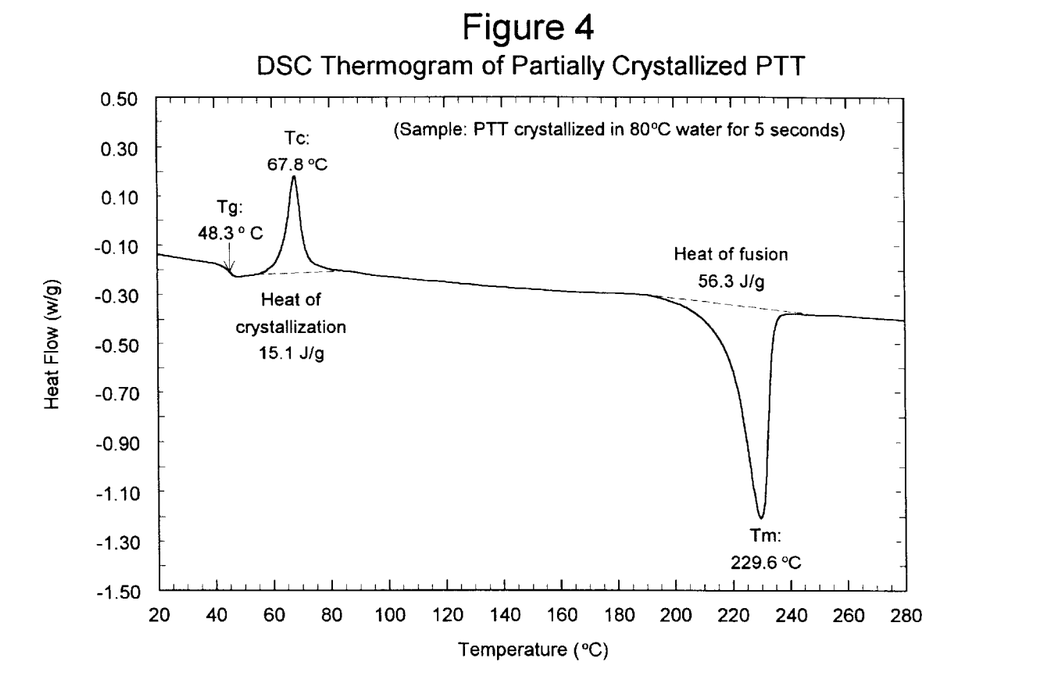
FIG. 4 is a DSC thermogram of a partially-crystallized polytrimethylene terephthalate sample which has been immersed in 80° C. water for 5 seconds.
Figure 5:
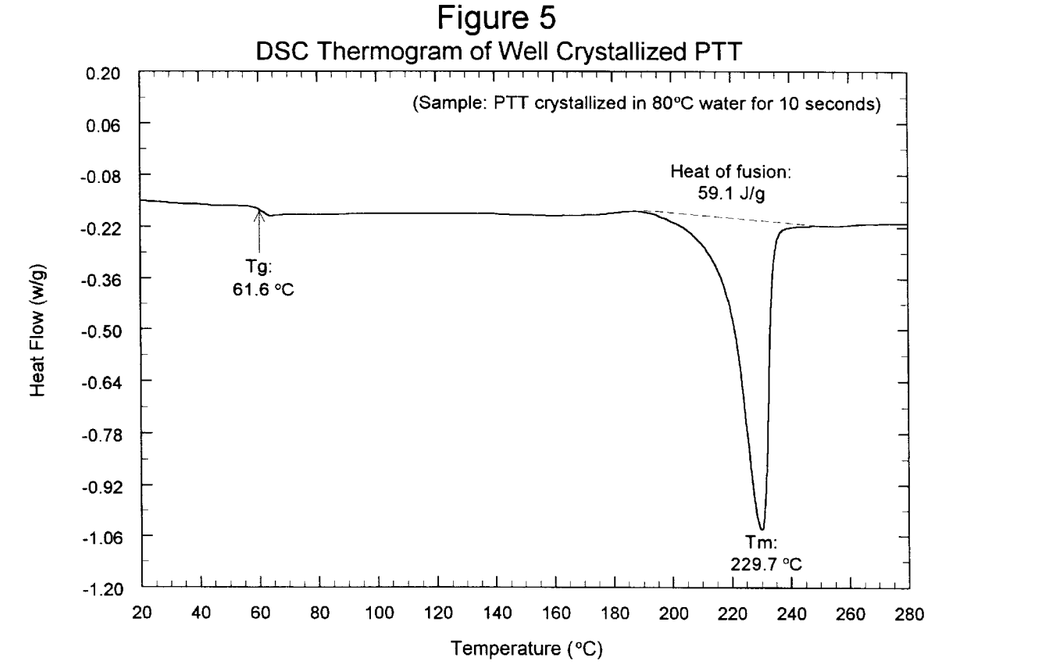
FIG. 5 is a DSC thermogram of a well-crystallized polytrimethylene terephthalate sample which had been immersed in 80° C. water for 10 seconds.
Figure 6:
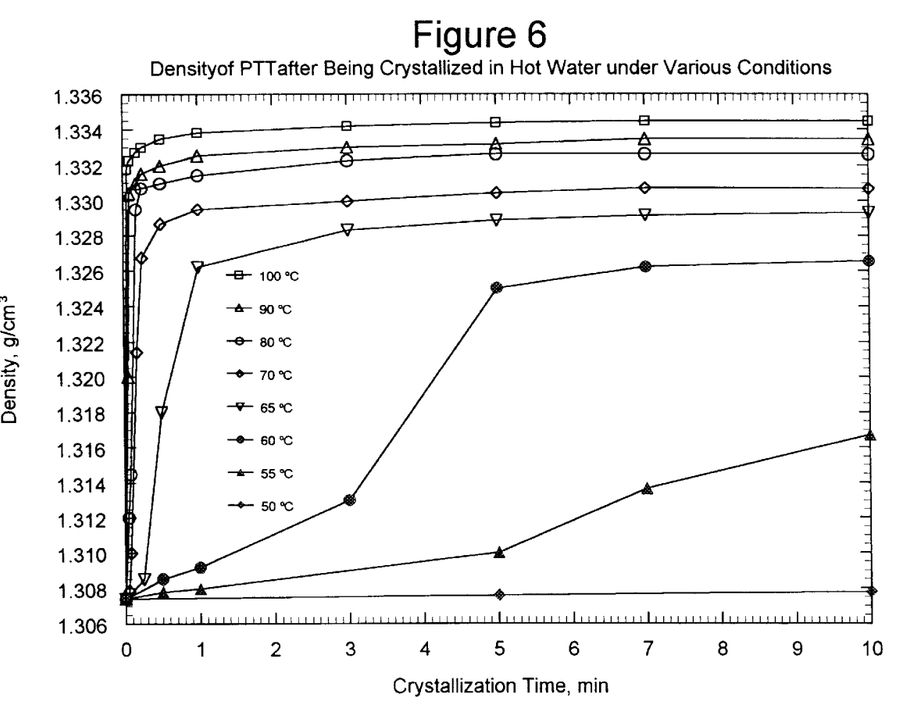
FIG. 6 shows the effects of hot-water immersion time and temperature on the density of polytrimethylene terephthalate.
Figure 7:
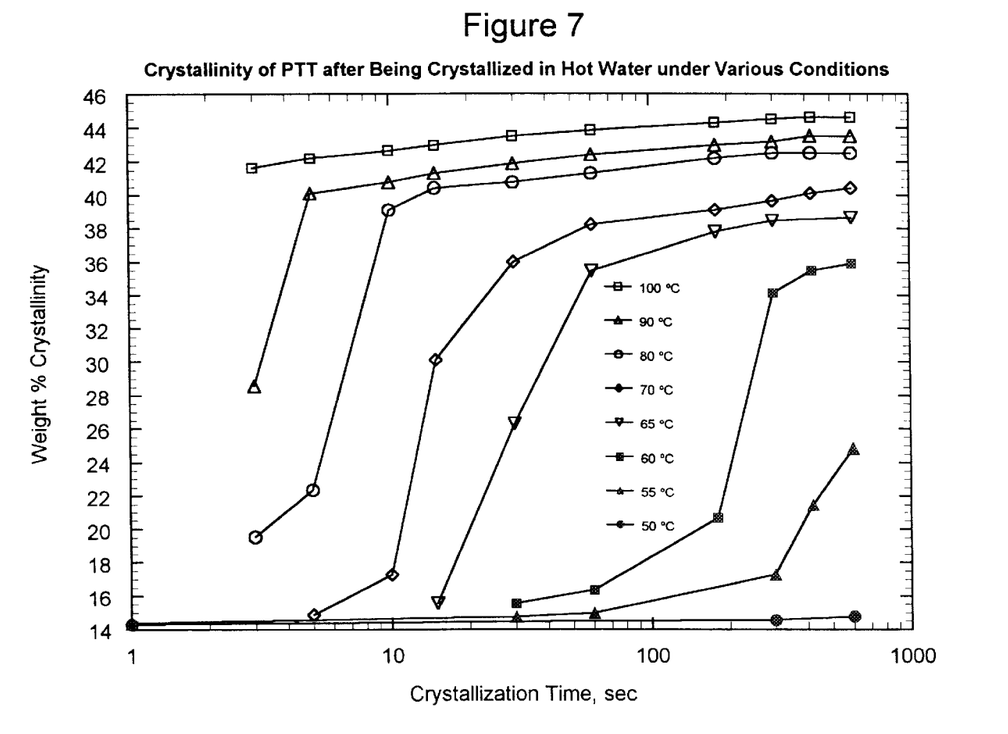
FIG. 7 shows the effects of hot-water immersion time and temperature on the degree of crystallinity of polytrimethylene terephthalate.

To ensure that the pellets are sufficiently crystallized to prevent blocking, it is desirable to crystallize the pellets to the extent that the product does not exhibit a conspicuous cold crystallization peak on its DSC thermogram (see FIGS. 3–5). The imparted degree of crystallization is related to the starting polymer density and IV, the temperature of the water and the length of time the polymer is immersed. The following chart provides general guidance on immersion times required to achieve 35% or greater crystallinity (for non-delustered polytrimethylene terephthalate) over the temperature range of 60 to 100° C.

| Water Temperature (° C.) | Crystallization Time |
|---|---|
| 60 | 20 minutes |
| 65 | 3 minutes |
| 70 | 30 seconds |
| 80 | 10 seconds |
| 90 | 5 seconds |
| 100 | 3 seconds |

For commercial operation, the desirability of faster crystallization must be balanced against the cost of maintaining higher water temperatures. The upper temperature is also limited by. the tendency of polytrimethylene terephthalate to undergo hydrolytic degradation (detected as a decrease in intrinsic viscosity) at temperatures above about 100° C. Preferably, the water temperature is within the range of about 65 to about 85° C. and the polymer is immersed for no longer than 3 minutes, preferably for a time within the range of about 3 seconds to about 3 minutes, with delustered polymer generally requiring longer immersion than non-delustered polymer.

After the selected residence time in the crystallizer, the pellet/water slurry is discharged into a pellet dryer. The pellets are cooled to a temperature below about 60°C., either by cold water quench en route to the dryer or, if the dryer environment is sufficiently cool, in the dryer itself.

Polytrimethylene terephthalate pellets treated by the invention process have an opaque appearance and typically exhibit the following physical properties:

density of at least about 1.33 g/cm$^3$ crystallinity of at least about 35%

Tg of at least about 60° C.

apparent crystallite size of at least about 10 nm

As used herein, "crystallinity" refers to an increase in the crystalline fraction and a decrease in the amorphous fraction of the polymer. In general, a crystallinity greater than about 35%, preferably within the range of about 36 to about 45%, is desired. The calculation of crystallinity herein is based on the relationship of volume fractional crystallinity (Xc) of a sample to the density (Ds) of the sample:

$$X_c = (D_s - D_a)/(D_c - D_a)$$

where $D_s$ is the density of the sample, $D_a$ is the density of amorphous polytrimethylene terephthalate (=1.295 g/cm$^3$) and Dc is the density of polytrimethylene terephthalate crystal (=1.387 g/cm$^3$). The weight fractional crystallinity equals $(D_c/D_s)X_c$. Crystallinity can also be estimated from a DSC thermogram, but it has been found that the described density method provides more consistent results, and this method has therefore been chosen for calculation of fractional crystallinity herein.

The invention process overcomes the problem of polytrimethylene terephthalate pellets adhering together during hot-weather storage or transportation, and enables drying of the pellets in a hopper-type dryer prior to melt processing or solid-state polymerization. The process also assists in reducing fines which can be generated in the manufacture and processing of polytrimethylene terephthalate. The resulting partially-crystallized polytrimethylene terephthalate pellets can be spun into fibers or made into film or engineering thermoplastics.

EXAMPLE 1

Hot-Water Crystallization of Amorphous Polytrimethylene Terephthalate.

Clear pellets of polytrimethylene terephthalate (total weight 5 g) having an IV of 0.904 dl/g, a degree of polymerization (DP) of about 102, and a weight per pellet of about 0.02 g were placed in a wire mesh basket. The basket was placed in a 4L beaker filled with water heated to a constant temperature (as indicated in Table 1) between 50 and 100° C. for a time ranging from 3 seconds to 30 minutes. The water was vigorously stirred over the time of immersion. The basket was removed from the hot water and immediately immersed in iced water to stop crystallization. After being permitted to dry in the room environment, each sample was tested as described below and the appearance of each sample was noted. Test results are shown in Table 1. Selected samples were also measured by wide angle x-ray diffraction (WAXD) to determine apparent crystallite size (ACS).

The IV of each treated sample was determined in 60:40 phenol:tetrachloroethane solvent at 30° C. A drop in IV indicates hydrolytic degradation during crystallization in hot water. As can be seen in Table 1, significant IV drops occurred only under the more severe crystallization conditions (e.g., 10 minutes or longer in 90° C. water and 5 minutes or longer in 100° C. water)

Each sample was scanned on a differential scanning calorimeter (DSC) at a rate of 10° C. per minute. Useful DSC data included Tg, heat of fusion and heat of crystallization. From the difference between the heat of fusion and the heat of crystallization on the thermogram, the crystallinity by weight of the sample was calculated using 146 J/g for the heat of fusion for crystalline polytrimethylene terephthalate. FIGS. 3, 4 and 5 are DSC thermograms for 3 samples having different degrees of crystallization.

FIG. 3 shows a DSC trace for a clear, as-pelletized polytrimethylene terephthalate sample. It shows a Tg inflection at 45° C., a cold crystallization peak with a peak temperature (Tc) at 68.9° C., and a fusion peak with a peak temperature (Tc) at 229.4° C. From the heat of fusion and heat of crystallization, the crystallinity of the sample was calculated to be 20.4% based on DSC.

FIG. 4 shows a DSC trace of a pelletized polytrimethylene terephthalate sample that had been immersed in 80°C. water for 5 seconds. This DSC trace has a smaller cold crystallization peak than the DSC trace in FIG. 3, reflecting the increased crystallinity of the sample (28.2%). The existence of the cold crystallization peak indicates that crystallization of this sample was incomplete. The Tg of the sample had increased to 48.3° C. as a result of its increased crystallinity.

FIG. 5 is a DSC trace of a pelletized polytrimethylene terephthalate sample that had been immersed in 80° C. water for 10 seconds. This DSC trace does not show a distinct cold crystallization exotherm, indicating that the sample was well crystallized. From the heat of fusion, the crystallinity of the sample was estimated to be 40.5%. The Tg of the sample was increased to 61.6° C. by the crystallization.

The density of each sample was determined in a density gradient column. From the density, the crystallinity was calculated using 1.295 g/cm$^3$ for the density of amorphous polytrimethylene terephthalate and 1.387 g/cm$^3$ for the density of polytrimethylene terephthalate crystal.

The apparent crystallite size of selected samples was determined using wide-angle x-ray diffraction measurements. Although the polymer pellets before hot-water treatment had some degree of crystallinity, the crystallites were too small to be detected by WAXD. After hot-water crystallization, the crystallites were large enough to be measured and ranged generally from about 10 to about 13 nm.

TABLE 1

Hot Water Crystallization Data for Polytrimethylene terephthalate

| Water Temp. (° C.) | Cryst. Time | Density (g/cm$^3$) | % Crystallinity Density | % Crystallinity DSC | DSC Cold Cryst heat (J/g) | Appearance | IV (dl/g) |
|---|---|---|---|---|---|---|---|
| NA (Control) | none | 1.3074 | 13.5 | 20.4 | 25.3 | Clear | 0.904 |
| 50 | 5 min | 1.3076 | 13.7 | 22.6 | 23.6 | Clear | 0.902 |
| 50 | 10 min | 1.3078 | 13.9 | 21.7 | 22.1 | Clear | 0.906 |
| 50 | 30 min | 1.3130 | 19.6 | 29.9 | 13.4 | Clear | 0.903 |
| 55 | 30 sec | 1.3078 | 13.9 | 24.2 | 22.1 | Clear | |
| 55 | 1 min | 1.3080 | 14.1 | 20.2 | 23.1 | Clear | |
| 55 | 5 min | 1.3100 | 16.3 | 26.3 | 19.2 | Clear | 0.908 |
| 55 | 7 min | 1.3137 | 20.3 | 24.5 | 15.1 | Hazy | 0.910 |
| 55 | 10 min | 1.3167 | 23.6 | 26.2 | 9.2 | Hazy | 0.903 |
| 55 | 20 min | 1.3234 | 30.9 | 34.3 | 5.2 | Translucent | 0.906 |
| 60 | 30 sec | 1.3085 | 14.7 | 21.0 | 24.5 | Clear | |
| 60 | 1 min | 1.3092 | 15.4 | 23.0 | 22.9 | Hazy | |
| 60 | 3 min | 1.3130 | 19.6 | 32.4 | 7.1 | Translucent | |
| 60 | 5 min | 1.3250 | 32.6 | 31.6 | 3.8 | Translucent | 0.906 |
| 60 | 7 min | 1.3262 | 33.9 | 33.3 | 3.2 | Translucent | 0.908 |
| 60 | 10 min | 1.3266 | 34.3 | 33.1 | 2.5 | Opaque | 0.906 |
| 60 | 20 min | 1.3269 | 34.6 | 34.9 | 1.8 | Opaque | 0.909 |
| 65 | 15 sec | 1.3085 | 14.7 | 23.0 | 11.8 | Clear | |
| 65 | 30 sec | 1.3180 | 25.0 | 29.8 | 1.5 | Hazy | |
| 65 | 1 min | 1.3262 | 33.9 | 31.5 | 0.8 | Translucent | 0.906 |
| 65 | 3 min | 1.3283 | 36.2 | 36.0 | 0 | Opaque | 0.907 |
| 65 | 5 min | 1.3289 | 36.8 | 37.7 | 0 | Opaque | 0.908 |
| 65 | 10 min | 1.3291 | 37.1 | 36.3 | 0 | Opaque | 0.904 |
| 65 | 20 min | 1.3293 | 37.3 | 36.9 | 0 | Opaque | 0.905 |

TABLE 1-continued

Hot Water Crystallization Data for Polytrimethylene terephthalate

| Water Temp. (° C.) | Cryst. Time | Density (g/cm³) | % Crystallinity Density | % Crystallinity DSC | DSC Cold Cryst heat (J/g) | Appearance | IV (dl/g) |
|---|---|---|---|---|---|---|---|
| 70 | 5 sec | 1.3079 | 14.0 | 22.3 | 24.5 | Clear | |
| 70 | 10 sec | 1.3100 | 16.3 | 21.1 | 20.8 | Hazy | |
| 70 | 15 sec | 1.3214 | 28.7 | 29.8 | 10.7 | Translucent | |
| 70 | 30 sec | 1.3282 | 36.1 | 37.5 | 0 | Opaque | |
| 70 | 1 min | 1.3287 | 36.6 | 36.8 | 0 | Opaque | 0.906 |
| 70 | 3 min | 1.3295 | 37.5 | 35.8 | 0 | Opaque | 0.907 |
| 70 | 5 min | 1.3300 | 38.0 | 38.0 | 0 | Opaque | 0.907 |
| 70 | 7 min | 1.3304 | 38.5 | 38.6 | 0 | Opaque | 0.906 |
| 70 | 10 min | 1.3307 | 38.8 | 37.9 | 0 | Opaque | 0.902 |
| 70 | 20 min | 1.3307 | 38.8 | 37.6 | 0 | Opaque | 0.905 |
| 80 | 3 sec | 1.3120 | 18.5 | 26.1 | 19.2 | Hazy | |
| 80 | 5 sec | 1.3145 | 21.2 | 24.0 | 20.6 | Translucent | |
| 80 | 10 sec | 1.3295 | 37.5 | 40.5 | 0 | Opaque | |
| 80 | 15 sec | 1.3307 | 38.8 | 38.6 | 0 | Opaque | |
| 80 | 30 sec | 1.3310 | 39.1 | 39.1 | 0 | Opaque | |
| 80 | 1 min | 1.3315 | 39.6 | 35.4 | 0 | Opaque | 0.902 |
| 80 | 3 min | 1.3323 | 40.5 | 39.5 | 0 | Opaque | 0.904 |
| 80 | 5 min | 1.3326 | 40.9 | 37.9 | 0 | Opaque | 0.905 |
| 80 | 7 min | 1.3327 | 40.9 | 40.7 | 0 | Opaque | 0.903 |
| 80 | 10 min | 1.3326 | 40.9 | 39.8 | 0 | Opaque | 0.904 |
| 80 | 20 min | 1.3329 | 40.9 | 38.7 | 0 | Opaque | 0.903 |
| 90 | 3 sec | 1.3200 | 27.2 | 29.9 | 12.4 | Translucent | |
| 90 | 5 sec | 1.3304 | 38.5 | 36.3 | 0 | Opaque | |
| 90 | 10 sec | 1.3310 | 39.1 | 36.6 | 0 | Opaque | |
| 90 | 15 sec | 1.3315 | 39.7 | 37.8 | 0 | Opaque | |
| 90 | 30 sec | 1.3320 | 40.2 | 36.1 | 0 | Opaque | |
| 90 | 1 min | 1.3325 | 40.8 | 37.6 | 0 | Opaque | 0.904 |
| 90 | 3 min | 1.3330 | 41.3 | 37.0 | 0 | Opaque | 0.905 |
| 90 | 5 min | 1.3332 | 41.5 | 38.9 | 0 | Opaque | 0.903 |
| 90 | 7 min | 1.3335 | 41.8 | 40.1 | 0 | Opaque | 0.904 |
| 90 | 10 min | 1.3337 | 41.8 | 39.8 | 0 | Opaque | 0.903 |
| 90 | 20 min | 1.3336 | 42.0 | 40.5 | 0 | Opaque | 0.900 |
| 100 | 3 sec | 1.3318 | 40.0 | 30.1 | 0 | Opaque | |
| 100 | 5 sec | 1.3323 | 40.5 | 36.3 | 0 | Opaque | |
| 100 | 10 sec | 1.3327 | 41.0 | 36.7 | 0 | Opaque | |
| 100 | 15 sec | 1.3330 | 41.3 | 40.0 | 0 | Opaque | |
| 100 | 30 sec | 1.3335 | 41.8 | 35.6 | 0 | Opaque | |
| 100 | 1 min | 1.3338 | 42.2 | 38.5 | 0 | Opaque | 0.903 |
| 100 | 3 min | 1.3342 | 42.6 | 27.7 | 0 | Opaque | 0.901 |
| 100 | 5 min | 1.3344 | 42.8 | 41.6 | 0 | Opaque | 0.898 |
| 100 | 7 min | 1.3345 | 42.9 | 37.7 | 0 | Opaque | 0.894 |
| 100 | 10 min | 1.3345 | 42.9 | 39.8 | 0 | Opaque | 0.897 |
| 100 | 20 min | 1.3347 | 43.2 | 40.2 | 0 | Opaque | 0.898 |
| 80 | 3 sec | 1.3120 | 18.5 | 26.1 | 19.2 | Hazy | |
| 80 | 5 sec | 1.3145 | 21.2 | 24.0 | 20.6 | Translucent | |
| 80 | 10 sec | 1.3295 | 37.5 | 40.5 | 0 | Opaque | |
| 80 | 15 sec | 1.3307 | 38.8 | 38.6 | 0 | Opaque | |
| 80 | 30 sec | 1.3310 | 39.1 | 39.1 | 0 | Opaque | |
| 80 | 1 min | 1.3315 | 39.6 | 35.4 | 0 | Opaque | 0.902 |
| 80 | 3 min | 1.3323 | 40.5 | 39.5 | 0 | Opaque | 0.904 |
| 80 | 5 min | 1.3326 | 40.9 | 37.9 | 0 | Opaque | 0.905 |
| 80 | 7 min | 1.3327 | 40.9 | 40.7 | 0 | Opaque | 0.903 |
| 80 | 10 min | 1.3326 | 40.9 | 39.8 | 0 | Opaque | 0.904 |
| 80 | 20 min | 1.3329 | 40.9 | 38.7 | 0 | Opaque | 0.903 |
| 90 | 3 sec | 1.3200 | 27.2 | 29.9 | 12.4 | Translucent | |
| 90 | 5 sec | 1.3304 | 38.5 | 36.3 | 0 | Opaque | |
| 90 | 10 sec | 1.3310 | 39.1 | 39.6 | 0 | Opaque | |
| 90 | 15 sec | 1.3315 | 39.7 | 27.8 | 0 | Opaque | |
| 90 | 30 sec | 1.3320 | 40.2 | 36.1 | 0 | Opaque | |
| 90 | 1 min | 1.3325 | 40.8 | 37.6 | 0 | Opaque | 0.904 |
| 90 | 3 min | 1.3330 | 41.3 | 37.0 | 0 | Opaque | 0.905 |
| 90 | 5 min | 1.3332 | 41.5 | 38.9 | 0 | Opaque | 0.903 |
| 90 | 7 min | 1.3335 | 41.8 | 40.1 | 0 | Opaque | 0.904 |
| 90 | 10 min | 1.3337 | 41.8 | 39.8 | 0 | Opaque | 0.903 |
| 90 | 20 min | 1.3336 | 42.0 | 40.5 | 0 | Opaque | 0.900 |
| 100 | 3 sec | 1.3318 | 40.0 | 30.1 | 0 | Opaque | |
| 100 | 5 sec | 1.3323 | 40.5 | 36.3 | 0 | Opaque | |
| 100 | 10 sec | 1.3327 | 41.0 | 36.7 | 0 | Opaque | |
| 100 | 15 sec | 1;3330 | 41.3 | 40.0 | 0 | Opaque | |
| 100 | 30 sec | 1.3335 | 41.8 | 35.6 | 0 | Opaque | |
| 100 | 1 min | 1.3338 | 42.2 | 38.5 | 0 | Opaque | 0.903 |
| 100 | 3 min | 1.3342 | 42.6 | 27.7 | 0 | Opaque | 0.901 |

TABLE 1-continued

Hot Water Crystallization Data for Polytrimethylene terephthalate

| Water Temp. (° C.) | Cryst. Time | Density (g/cm³) | % Crystallinity | | DSC Cold Cryst heat (J/g) | Appearance | IV (dl/g) |
|---|---|---|---|---|---|---|---|
| | | | Density | DSC | | | |
| 100 | 5 min | 1.3344 | 42.8 | 41.6 | 0 | Opaque | 0.898 |
| 100 | 7 min | 1.3345 | 42.9 | 37.7 | 0 | Opaque | 0.894 |
| 100 | 10 min | 1.3345 | 42.9 | 39.8 | 0 | Opaque | 0.897 |
| 100 | 20 min | 1.3347 | 43.2 | 40.2 | 0 | Opaque | 0.898 |

We claim:

1. A process for reducing the self-adhesiveness of polytrimethylene terephthalate pellets comprising the steps of:

contacting melt-phase-polymerized polytrimethylene terephthalate pellets having an intrinsic viscosity of at least 0.4 dl/g with an aqueous liquid at a temperature within the range of 60 to 100° C. for a time sufficient to induce a degree of crystallinity of 35% to 45% in the polytrimethylene terephthalate pellets.

2. The process of claim 1 in which the polytrimethylene terephthalate pellets have an intrinsic viscosity within the range of 0.5 to 1.0.

3. The process of claim 1 in which the polytrimethylene terephthalate pellets are maintained in contact with the aqueous liquid for a time within the range of 3 seconds to 3 minutes.

4. The process of claim 1 in which the aqueous liquid temperature is within the range of 65 to 85° C.

5. The process of claim 1 which further comprises providing continuous pellet movement during contact with the aqueous liquid.

6. The process of claim 1 in which the pellets are contacted with the aqueous liquid for a sufficient time to produce polytrimethylene terephthalate pellets having a glass transition temperature of at least 60° C.

7. The process of claim 1 in which the polytrimethylene terephthalate pellets have a differential scanning calorimeter thermogram characterized by the absence of a cold crystallization peak.

8. The process of claim 1 in which the crystallinity of the treated polytrimethylene terephthalate pellets is within the range of 36 to 45%.

9. The process of claim 1 in which the treated polytrimethylene terephthalate pellets have an apparent crystallite size within the range of 10 to 13 nm.

10. The process of claim 1 in which the polytrimethylene terephthalate pellets have a density of at least 1.33 g/cm³.

* * * * *